(12) United States Patent
Wu et al.

(10) Patent No.: US 10,002,101 B2
(45) Date of Patent: Jun. 19, 2018

(54) METHODS AND APPARATUS FOR EQUALIZATION OF A HIGH SPEED SERIAL BUS

(71) Applicant: Apple Inc., Cupertino, CA (US)

(72) Inventors: Songping Wu, Austin, TX (US); Zhiping Yang, Cupertino, CA (US); Kirill Kalinichev, San Francisco, CA (US); Greg Nayman, Mountain View, CA (US); Georgi Beloev, Walnut Creek, CA (US)

(73) Assignee: APPLE INC., Cupertino, CA (US)

( * ) Notice: Subject to any disclaimer, the term of this patent is extended or adjusted under 35 U.S.C. 154(b) by 309 days.

(21) Appl. No.: 14/641,170

(22) Filed: Mar. 6, 2015

(65) Prior Publication Data
US 2016/0267044 A1     Sep. 15, 2016

(51) Int. Cl.
  *G06F 13/00*   (2006.01)
  *G06F 13/42*   (2006.01)
  *G06F 13/40*   (2006.01)
  *G06F 1/32*    (2006.01)

(52) U.S. Cl.
  CPC ...... *G06F 13/4282* (2013.01); *G06F 13/4022* (2013.01); *G06F 1/3287* (2013.01)

(58) Field of Classification Search
  CPC . G06F 13/4282; G06F 13/4022; G06F 1/3287
  See application file for complete search history.

(56) References Cited

U.S. PATENT DOCUMENTS

| | | | | |
|---|---|---|---|---|
| 3,594,612 A | * | 7/1971 | Gately | H02H 9/041 327/310 |
| 3,638,132 A | * | 1/1972 | Trilling | H03F 3/45479 330/260 |
| 4,007,423 A | * | 2/1977 | Dickinson | H04N 7/173 324/76.23 |

(Continued)

FOREIGN PATENT DOCUMENTS

EP     1385305 B1 *  6/2011   ....... G11B 20/10009

OTHER PUBLICATIONS

"How to make optimal use of signal conditioning in 40 Gb/s copper interconnects" by Jan De Geest, Jim Nadolny, and Stefaan Sercu, DesignCon 2003 High-Performance System Design Conference.*

(Continued)

*Primary Examiner* — Jing-Yih Shyu
(74) *Attorney, Agent, or Firm* — Gazdzinski & Associates, PC

(57) ABSTRACT

Methods and apparatus for equalization of a high speed serial bus. A well-tuned passive equalization circuit for use with high frequency differential signals suffer from e.g., impedance mismatches, impedance discontinuities (e.g., connectors, etc.). In one embodiment, a shunting circuit is inserted between the differential terminals of a Universal Serial Bus (USB) cable, connector, etc. The shunting circuit is configured to "open" at low frequencies to enable Full Speed (FS) enumeration, while also providing sufficiently high impedance at high frequencies to enable High Speed (HS) operation. In one such implementation, the shunting circuit includes a tuned resistor, capacitor, inductor, and switch element arranged in series.

19 Claims, 20 Drawing Sheets

(56) References Cited

U.S. PATENT DOCUMENTS

| | | | | |
|---|---|---|---|---|
| 5,343,162 A * | 8/1994 | Davis | ............ | H04B 1/04 330/252 |
| 5,889,447 A * | 3/1999 | Newell | ............ | H01P 1/2056 333/202 |
| 6,175,274 B1 * | 1/2001 | Groe | ............ | H03F 3/72 330/100 |
| 7,035,361 B2 * | 4/2006 | Kim | ............ | H04L 25/03076 375/348 |
| 9,104,822 B2 * | 8/2015 | Fu | ............ | G06F 13/4045 |
| 9,886,402 B2 * | 2/2018 | Hopgood | ............ | G06F 13/385 |
| 2002/0173724 A1 * | 11/2002 | Dorando | ............ | A61B 5/0215 600/486 |
| 2007/0097658 A1 * | 5/2007 | Yang | ............ | H05K 1/0231 361/780 |
| 2009/0088650 A1 * | 4/2009 | Corl | ............ | A61B 5/0215 600/486 |
| 2012/0252389 A1 * | 10/2012 | Krishnan | ............ | H03G 3/3078 455/200.1 |
| 2013/0078914 A1 * | 3/2013 | Royston | ............ | H04B 5/0031 455/41.1 |
| 2013/0084801 A1 * | 4/2013 | Royston | ............ | G06K 7/015 455/41.1 |

OTHER PUBLICATIONS

"Current Shunt & Voltage Measurement Reference Design for EV/HEV Automotive Battery Monitoring" by Dale Li, TIDUA81—Oct. 2015.*

"High-Speed Link Tuning Using Signal Conditioning Circuitry in Stratix V Transceivers" by Altera Corporation, Feb 26, 2015.*

Universal Serial Bus 3.0 Specification; Revision 1.0 dated Jun. 6, 2011.

Universal Serial Bus Specification, Revision 2.0 dated Apr. 27, 2000.

* cited by examiner

METHODS AND APPARATUS FOR EQUALIZATION OF A HIGH SPEED SERIAL BUS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of high speed serial buses, as well as signal integrity and conditioning thereof. More particularly, in one exemplary aspect, the disclosure is directed to methods and apparatus for equalization of a high speed serial bus. Various aspects of the present disclosure are directed to passive equalization.

SUMMARY

The present disclosure satisfies the foregoing by providing, inter alia, methods and apparatus for equalization of a high speed serial bus.

In a first aspect of the present disclosure, a signal conditioning apparatus is disclosed. In one exemplary embodiment, the signal conditioning apparatus includes: a first cable interface including a differential pair; a second cable interface including the differential pair; where the differential pair includes a positive and a negative terminal that are coupled via a shunting circuit; and where the shunting circuit is configured to present a high impedance between the positive and negative terminals at a first frequency.

In one variant, the shunting circuit is configured to present a high impedance between the positive and negative terminals at a second frequency different than the first.

In another variant, the shunting circuit additionally includes a switch element configured to open and close the shunting circuit. In one such variant, the switch element is configured to open the shunting circuit during a first operational mode and close the shunting circuit during a second operational mode.

In a third variant, the shunting circuit is configured to flatten an attenuation over an increased frequency range. In one exemplary variant, the attenuation does not exceed 3 decibels (dB) over the increased frequency range of 300 Megahertz (MHz). In one exemplary case, the differential pair includes Universal Serial Bus (USB) D+ and D− terminals.

In another aspect of the present disclosure, a signal conditioning apparatus is disclosed. In one exemplary embodiment, the signal conditioning apparatus includes: a differential pair that includes a positive and a negative terminal that are coupled via a shunting circuit; where the shunting circuit includes at least a switch element; and where the shunting circuit is configured to alter a frequency response of the differential pair for at least one mode of operation.

In one variation, the alteration includes an increase in an insertion loss.

In another variant, the alteration includes a flatter frequency response. In one such variant, the flatter frequency response includes a range of frequencies from direct current (DC) to 300 Megahertz (MHz). In one such variant, the shunting circuit may include a resistor, an inductor and a capacitor. In one such case, the resistor, the inductor, and the capacitor are connected in series between the positive and negative terminal. In some implementations, the capacitor is selected to enable single ended signaling via the differential pair.

A method for equalizing a high speed serial bus is disclosed. In one embodiment, the method includes: determining the high speed serial bus configuration; selecting one or more tuning considerations; selecting a shunting impedance from one or more possible shunting impedances; and enabling the selected shunting impedance.

In one variant, determining the high speed serial bus configuration includes discovering one or more devices attached to the high speed serial bus.

In another variant, determining the high speed serial bus configuration includes determining one or more operational modes. In one such example, the one or more tuning considerations includes flattening a frequency response corresponding to at least one of the one or more operational modes. In another such example, the one or more tuning considerations includes increasing an insertion loss corresponding to at least one of the one or more operational modes. In one such implementation, the increased insertion loss enables a higher transmit power setting.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

The features, objectives, and advantages of the disclosure will become more apparent from the detailed description set forth below taken in conjunction with the drawings, wherein.

Figure 1:
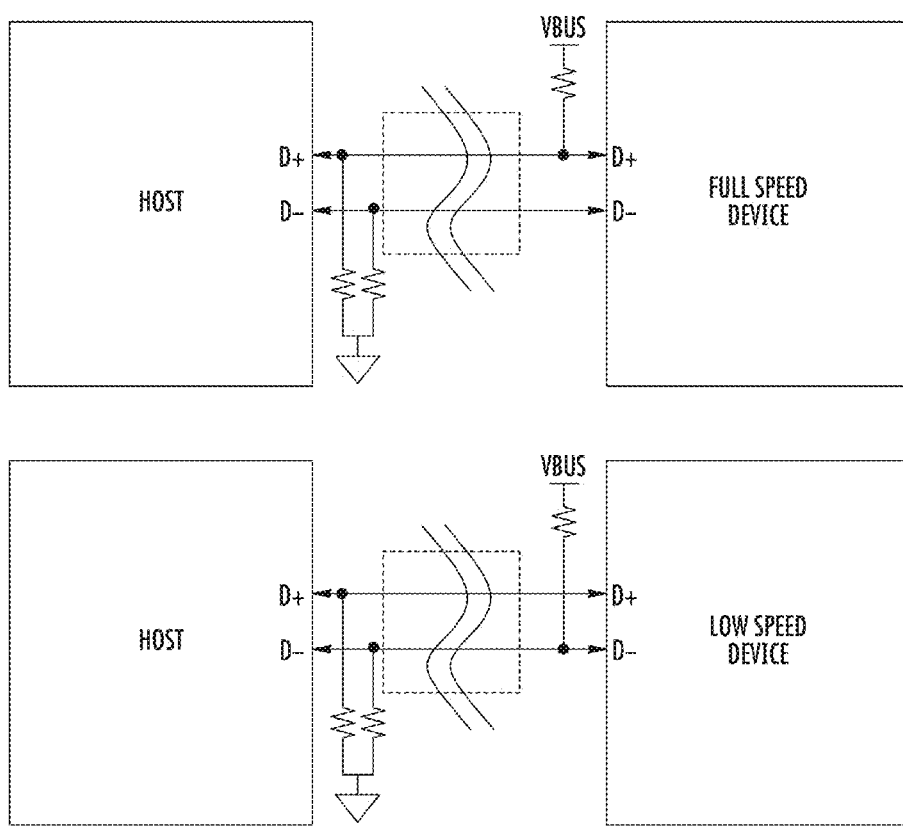
FIG. 1 is a logical block diagram illustrating speed detection based on pull-up resistor placement within prior art Universal Serial Bus (USB) devices.

All Figures © Copyright 2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of a high speed serial bus, it will be recognized by those of ordinary skill that the present disclosure is not so limited. In fact, the various aspects of the disclosure are useful in any connection technology that is subject to signal integrity issues (e.g., parallel buses, board fabrication, external cabling, etc.) as is disclosed herein.

Exemplary embodiments of the present disclosure are now described in detail. While these embodiments are discussed primarily in terms of a serial bus that is compliant with the Universal Serial Bus (USB) standard, it will be recognized by those of ordinary skill that the present disclosure is not in any way limited to USB-compliant technologies. The general principles described herein may be readily extended to other technologies and/or applications by artisans of ordinary skill in the arts given the contents of the present disclosure, the following therefore being merely exemplary in nature.

As used herein, the term "bus" refers without limitation to any physical and/or logical path for data transfer, transmission, and receipt. Common examples of bus technologies include, without limitation: USB (Universal Serial Bus) (e.g., USB 2.0, USB On-The-Go (OTG), USB 3.0, etc.), FireWire, Thunderbolt, High Definition Multimedia Interface (HDMI), DisplayPort, etc.

Within the context of USB bus technologies, USB peripheral devices are connected in a so-called "tiered-star" topology to a single USB host device. The host device manages communication to various client devices within the network. While the following embodiments are described in relation to a tiered-star topology, those of ordinary skill in the related arts will readily appreciate that the various principles described herein are readily applicable to a myriad of other network topologies, including without limitation: daisy chain, star, ring, mesh, tree, and/or hybrids thereof. Additionally, while the following examples are presented in the context of a single host device, it should be further apparent that the various methods are in no way so limited, and may be readily implemented within e.g., peer-to-peer networks, multiple host devices, decentralized networks, etc.

Within the context of USB technologies, host devices are characterized in that they contain a USB Host Controller (HC). Each USB host may have multiple USB Host Controllers (HCs), and each HC may provide one or more interfaces which support one or more USB connectors. USB peripheral devices can be directly coupled to the one or more USB connectors, and/or linked in series (or tiers) through hubs.

Host devices and peripheral devices may include, but are not limited to, personal computers (PCs) (whether desktop, laptop, handheld or otherwise), and mobile devices such as smartphones, PDAs, digital and video cameras, personal media devices (PMDs) (such as MP3 players, printers or rendering devices), or any combinations of the foregoing.

While the following embodiments describe specific implementations of e.g., passive signal conditioning, those of ordinary skill in the related arts will readily appreciate that such descriptions are purely illustrative.

USB Signal Integrity Issues—

The Universal Serial Bus (USB) is a body of standards and associated errata that defines cables, connectors and communications protocols used in a bus for connection, communication, and power supply between host and peripheral devices. Historically, USB was designed to connect simple peripherals (e.g., mice, keyboards, etc.) to a personal computer (PC). Over time, USB has become nearly ubiquitous in use, and is now commonly found in a wide ecosystem of consumer electronics devices (e.g., digital cameras, media players, mass storage devices, etc.)

Existing industrial design and use case scenarios (as in e.g., car adapters, relays, etc.) are constantly pushing the envelope of cabling capabilities. Competitive products seek smaller form factors and power reduction while still retaining or increasing transmission lengths, interface speeds, etc. Consequently, existing cable designs are marginal at best. Furthermore, existing and/or novel usage scenarios may additionally exacerbate signal conditioning requirements. For example, many usage scenarios contemplate relaying connectivity through one or more hubs, relays, etc. Those of ordinary skill in the related arts will readily appreciate that each additional connector in the chain of linkages may introduce impedance mismatches which manifest as reflections and/or other undesirable interferences (e.g., noise, inter-symbol interference (ISI), etc.). In extreme cases, existing cable technologies are completely unable to meet desired capabilities.

During normal operation, USB uses a differential transmission pair for transacting data. In differential signaling modes, the data is encoded using non-return to zero inverted (NRZI) and is bit stuffed to ensure adequate transitions in the data stream. For example, on Low and Full Speed (FS) devices, a differential '1' (logic high) is transmitted by pulling D+ (also referred to as DP, or P) over 2.8V and D− (also referred to as DN, or N) under 0.3V. A differential '0' (logic low) is a D− greater than 2.8V and a D+ less than 0.3V. In contrast, under single-ended signaling modes, certain bus states are indicated by single ended signals on D+, D− or both. For example a single ended zero (SE0) is generated by holding both D− and D+ low (<0.3V), and can be used to indicate e.g., reset.

Additionally, many USB devices support various signaling speeds. For example, USB 2.0 devices may support Low Speed, Full Speed (FS), and High Speed (HS) operation. Low Speed devices transact data at 1.5 Megabits per second (Mbit/s); FS devices transact data at 12 Mbit/s. HS devices provide signaling rates at up to 480 Mbits/s. As those of ordinary skill in the related arts will readily appreciate that different data rates have different corresponding frequency considerations; for example, high frequency signaling is disproportionately adversely affected by high frequency interference, etc.

In addition to differential signaling modes, USB also incorporates single-ended signaling for certain bus states. For example, during the initialization process, the USB device indicates its speed (to the USB host) by pulling either the D+ or D− line high to 3.3 volts. A Full Speed (FS) device has a pull up resistor (1.5K ohm) attached to D+ to identify itself as a FS device, whereas a Low Speed device uses a pull up resistor attached to D− to identify itself as a Low Speed device. As shown in FIG. 1, the D+ and D− lines have relatively weak 15K ohm pull down resistors. High Speed (HS) devices start by connecting as a FS device and once attached, perform a high speed "chirp" during reset to establish a HS connection (if the host supports it). Thereafter, the resistors are switched out of the channel entirely.

Those of ordinary skill in the related arts will readily appreciate that the confluence of factors surrounding USB adoption and usage (e.g., a wide ecosystem, aggressive industrial design constraints, different data rates of operation, etc.), create an incredibly difficult problem for device manufacturers. In particular, ideal solutions for improving USB signal integrity should optimize signaling margins over the entire range of operation (e.g., Low Speed, Full Speed, High Speed, etc.).

Figure 2A:
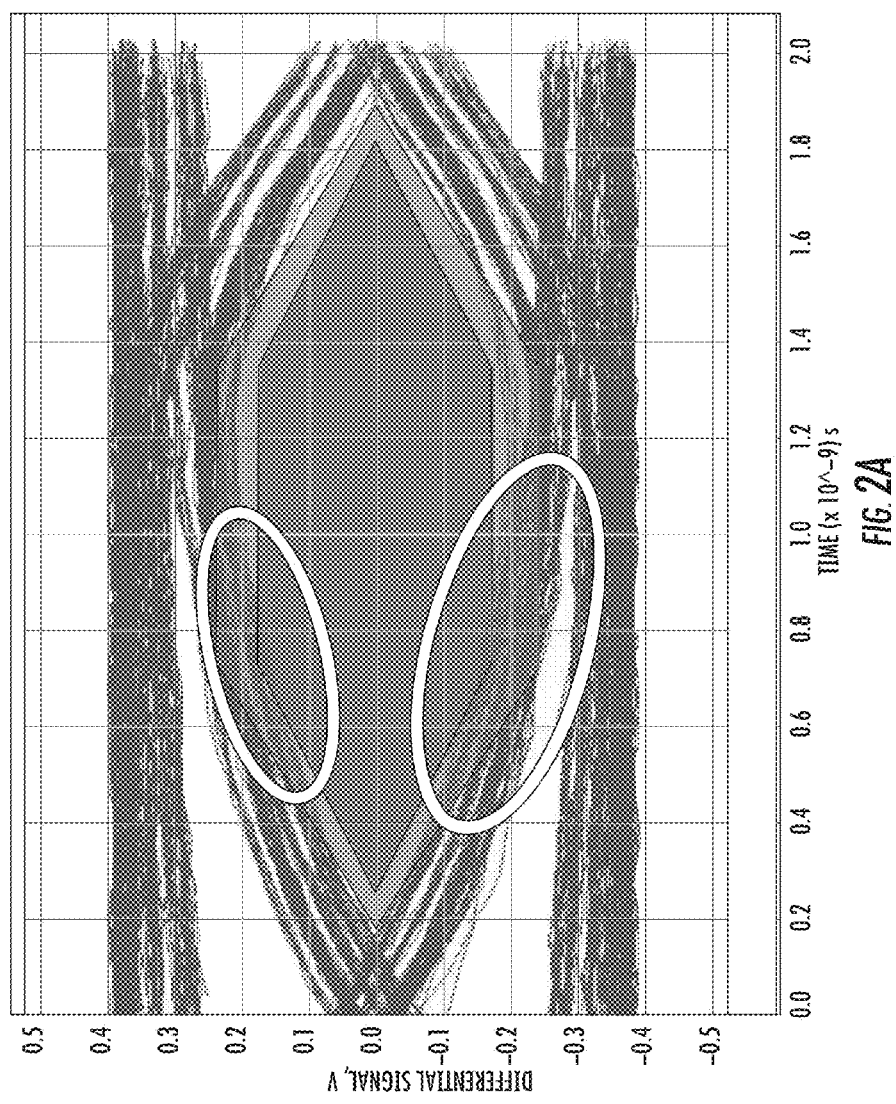
FIG. 2A is a graphical representation of an eye diagram and corresponding eye mask.

As a brief aside, FIG. 2A illustrates an exemplary "eye diagram" used within the related arts. An eye diagram is a pattern produced (e.g., on test equipment) when a digital signal on a transmission line is repetitively sampled by using logic level transition edges to trigger a horizontal sweep. Between transitions, the measured voltage can be at a discrete logic level (e.g., logic low, logic high). However, undesirable transmission line effects will "close" the eye. For example, clock jitter will randomly increase or decrease the amount of time between transition edges, which narrows the eye between transitions. Similarly, poorly matched line impedances will introduce signaling reflections, undershoots, and overshoots, which will muddy the distance between the discrete levels of the eye.

Eyes are typically further evaluated with the use of an "eye mask". The eye mask indicates the degree of acceptable deviance from the eye before the receiver misinterprets the signaling. In other words, the eye mask represents the maximum system tolerance for channel effects. Thus, an eye that crosses (i.e., an "incursion") into the eye mask will have an unacceptable error rate. As shown, the eye diagram of FIG. 2A has incursions in the upper and lower left-hand corners.

Figure 2B:
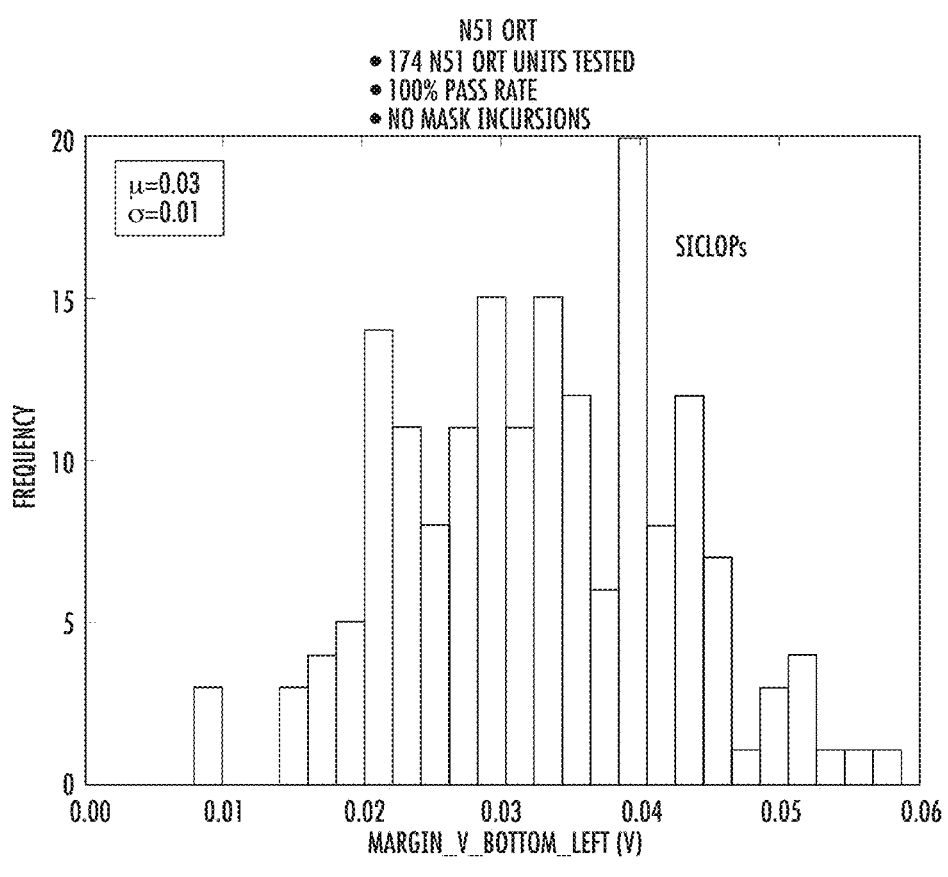
FIG. 2B shows three (3) histograms of empirically observed mask incursions in conformance testing for three (3) actual prototype USB designs.
Figure 2B:
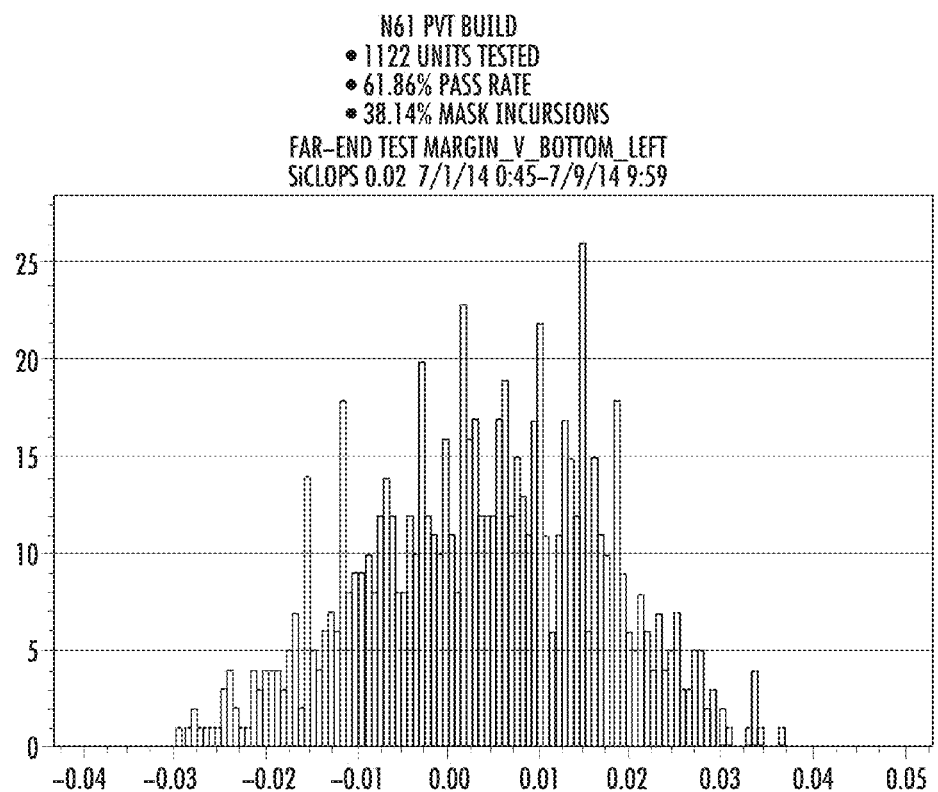
Figure 2B:
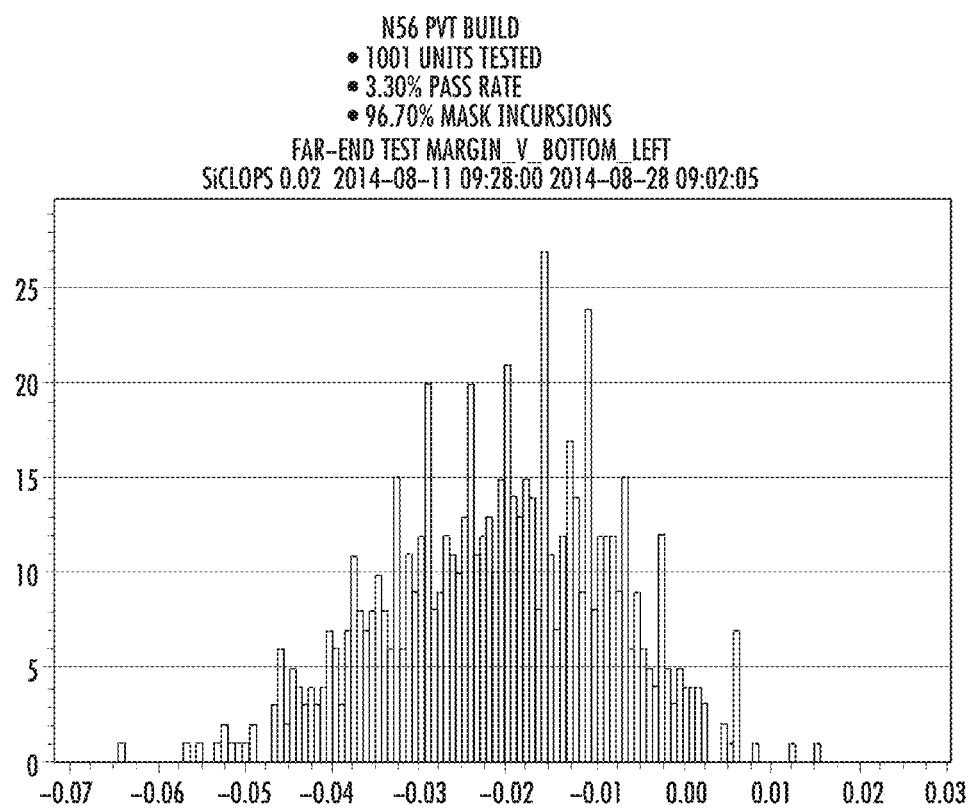

As shown in FIG. 2B, conformance testing for three (3) actual prototype USB designs are illustrated during HS operation. Each of the conformance test histograms illustrates a frequency of failure (out of 1000+ units tested), and voltage margin, when tested with a USB 275 mV eye mask within a common configuration (e.g., when connected to an iPhone™ (manufactured by the Assignee hereof) in combination with a car adapter). As shown, the horizontal axis indicates the amount of margin from the eye mask at the bottom left corner of the eye generated by transitions from high to low voltage (typically the worst corner). A negative value indicates an incursion into the eye mask (i.e., a violation). The vertical axis represents the frequency of failure within the tested units. As shown, the three (3) designs progressively worsen in yield (e.g., 100% pass rate, 61.86% pass rate, and 3.30% pass rate).

To these ends, methods and apparatus for equalization of a high speed serial bus are desired. Various aspects of the present disclosure present solutions for high frequency differential signaling that suffers from reflections introduced by impedance discontinuities (e.g., connectors, etc.) which do not adversely affect low frequency signals.

Exemplary Passive Conditioning—

Within the context of signal integrity, insertion loss can be represented as an amount of attenuation (decibels (dB) of attenuation) over a range of frequencies. Historically, designs have attempted to minimize insertion loss. Instead, one aspect of the present disclosure is directed to flattening the frequency loss. In one embodiment, a signal conditioning circuit is introduced which provides an acceptable trade-off in insertion loss for better frequency fidelity.

Figure 3:
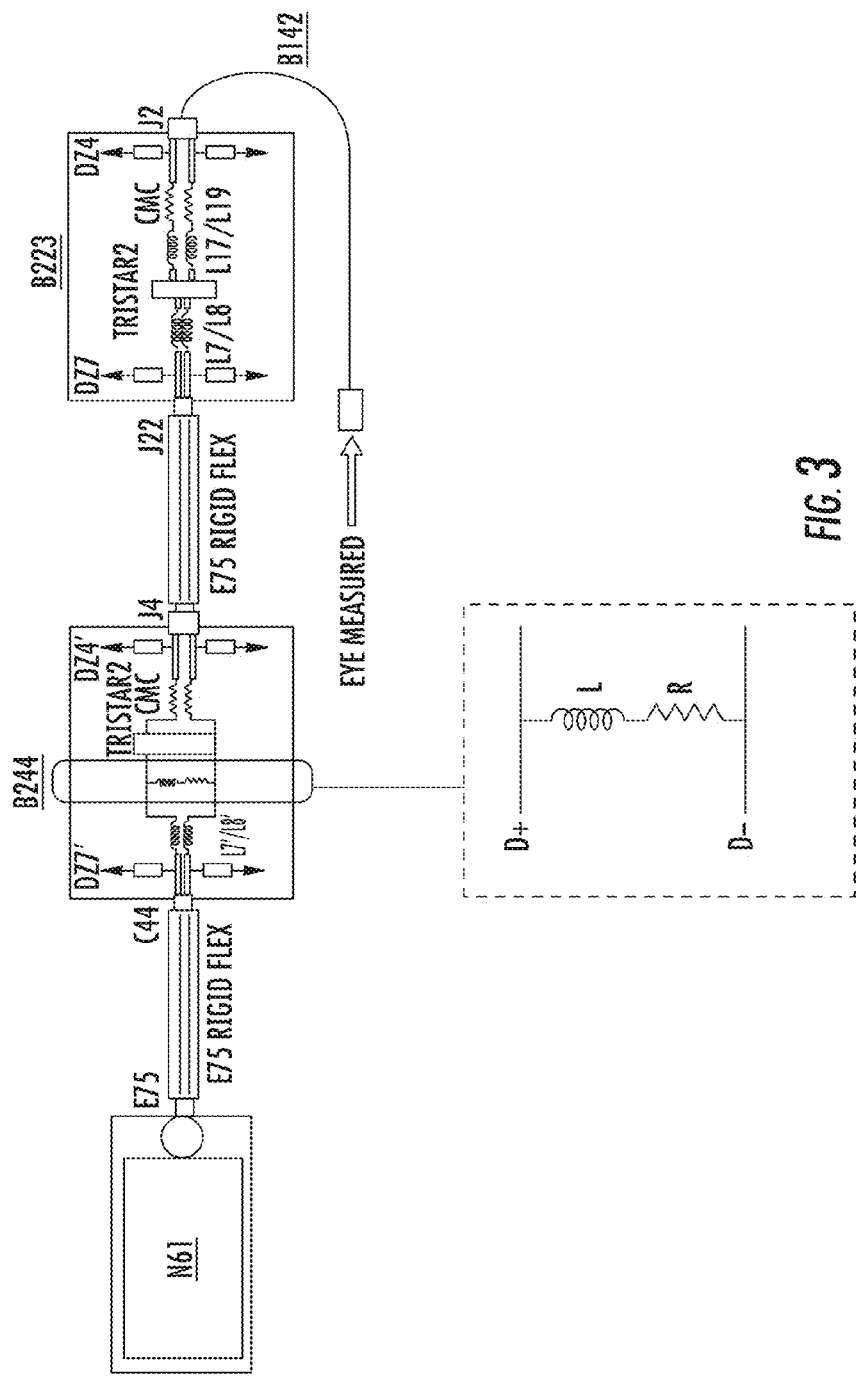
FIG. 3 is a graphical representation of one exemplary embodiment of a resistive-inductive (RL) passive equalization circuit.
Figure 3A:
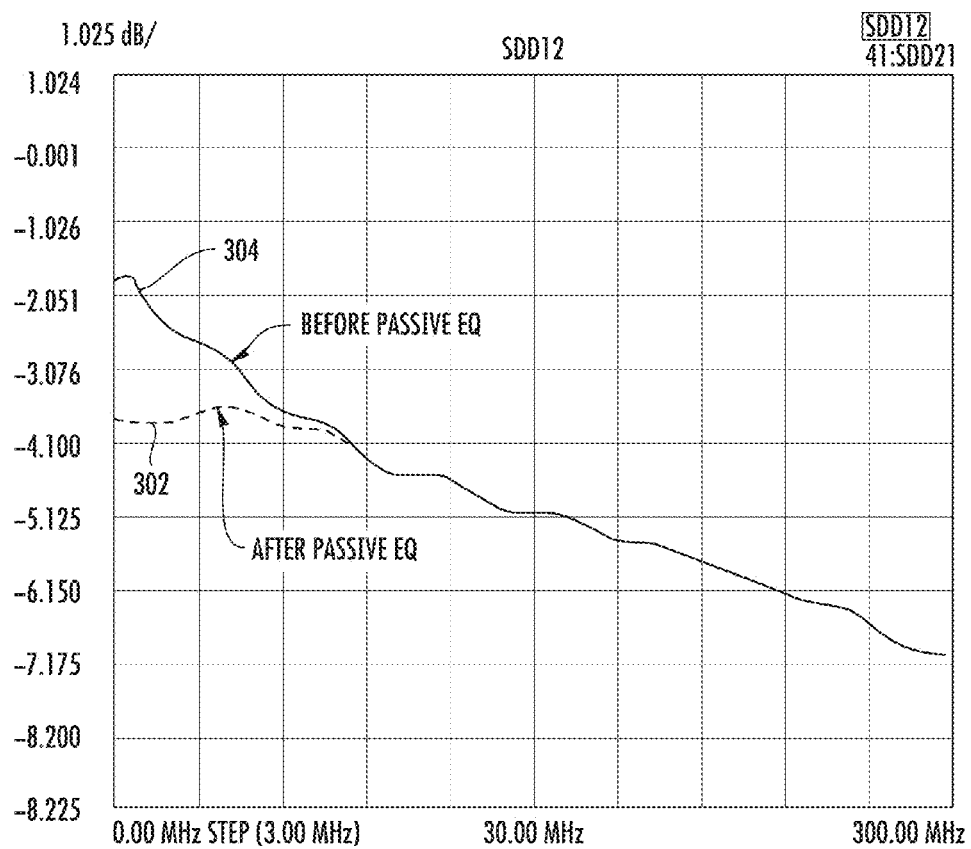
FIG. 3A is a graphical representation of the frequency response of the RL passive equalization circuit of FIG. 3.

Referring now to FIG. 3, one exemplary embodiment of a resistive-inductive (RL) passive equalization circuit is illustrated. The passive equalization circuit includes one resistor and one inductor which are connected between the Universal Serial Bus (USB) differential cabling lines (D+, D−). FIG. 3A illustrates the frequency response 302 of USB cabling with the exemplary RL circuit of FIG. 3A having a resistor of 250 Ohms (Ω) and an inductor of 1 microHenry (µH). For comparison, the frequency response 304 of the prior art cabling without passive equalization is also shown.

Within FIG. 3A, the prior art cabling frequency response without passive equalization has relatively low insertion loss (e.g., approximately −2 dB) at DC (direct current), that rapidly falls off to −5 dB at approximately 30 Megahertz (MHz). From a frequency response perspective, the frequency components at 30 MHz are half (50%) the magnitude of the frequency components at DC. In other words, the frequency response of the prior art cable is skewed to under represent high frequency components of a signal. This results in slower edge transitions, which can cause eye mask incursions.

In contrast, the frequency response of the cabling with the exemplary RL circuit has a much flatter frequency response. Specifically, the DC insertion loss is approximately −4 dB (which is slightly worse), which decreases to −7 dB at ~300 MHz. Effectively, the passive equalization circuit trades insertion loss for a flatter frequency response. More generally, adding the RL passive equalization circuit attenuates lower frequency components which e.g., prevents jitter and voltage shifts, etc. Those of ordinary skill in the related arts will readily appreciate that the RL passive equalization circuit operates as a high-pass filter which is configured to pass frequencies higher than a certain cutoff frequency and attenuates frequencies lower than the cutoff frequency.

Figure 4:
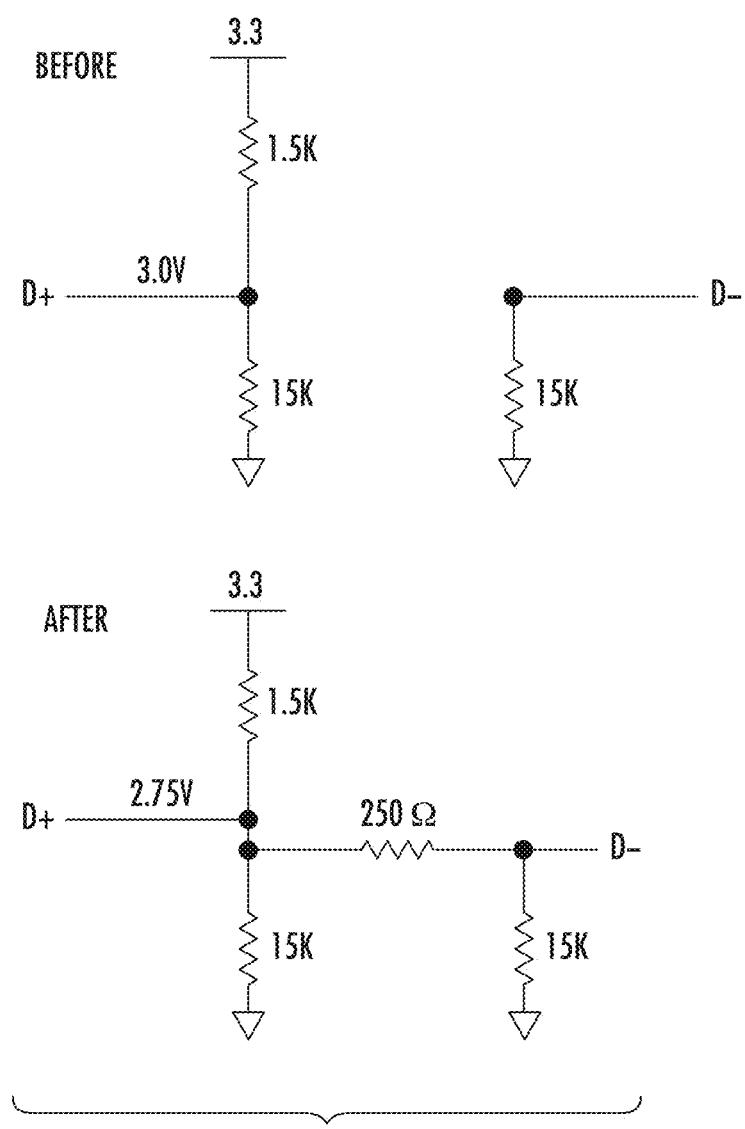
FIG. 4 shows a simplified circuit diagram representations of a USB transceiver before and after the exemplary RL passive conditioning coupling of FIG. 3.

While the RL passive equalization circuit of FIG. 3 (as evidenced in FIG. 3A) provides significant improvement in signal integrity for transacting data via a differential transmission pair at high frequencies, USB also incorporates single-ended signaling for certain bus states at low frequencies. Unfortunately, the RL passive equalization circuit can introduce particular undesirable effects within the low frequency operations. At low frequencies down to DC (0 Hz), the inductor behaves as a short (i.e., no significant resistance); thus the linear circuit effects are dominated by the resistor components. For illustrative purposes, the simplified circuit diagram representation of a USB transceiver D+ and D− terminals before and after the exemplary RL passive conditioning coupling is shown in FIG. 4.

Figure 4A:
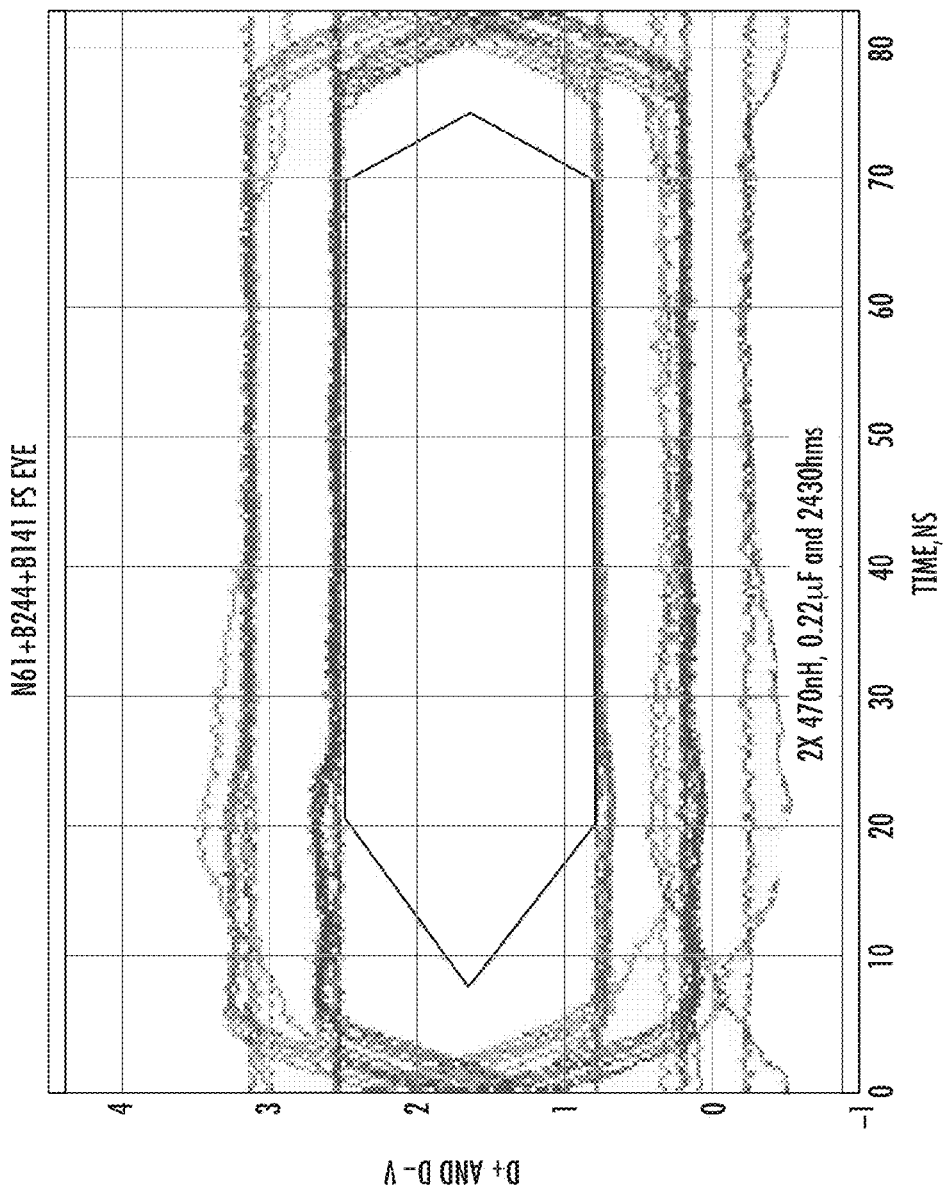
FIG. 4A is a graphical representation of the eye diagram corresponding to the exemplary RL passive conditioning coupling of FIG. 3.

During Full Speed enumeration, when a prior art USB host is coupled to a prior art USB peripheral, the peripheral pulls D+ up via a 1.5 kΩ to ~3.3V, resulting in a detectable voltage of ~3.0V at D+. Since D− is not coupled to D+, D− is unaffected by the peripheral's pull up resistor. However, once the exemplary RL passive equalization circuit is added, D+ and D− are coupled via a 250Ω shunt resistor and inductor. When a USB peripheral is connected, the peripheral pulls D+ (and to a lesser extent D−) up to ~2.75V; this voltage is significantly below detection thresholds for proper Full Speed enumeration. Additionally, since D+/D− are coupled together, their DC offsets are ~500 mV. These DC offsets are dangerously close to violating the Full Speed USB eye (see FIG. 4A); consequently, marginal connections may actually fail USB eye tolerances. Circuit analysis shows that the DC offsets are due to the small resistive value of the shunt resistor and the relatively long charging time of the inherent capacitances in the cable.

Figure 5:
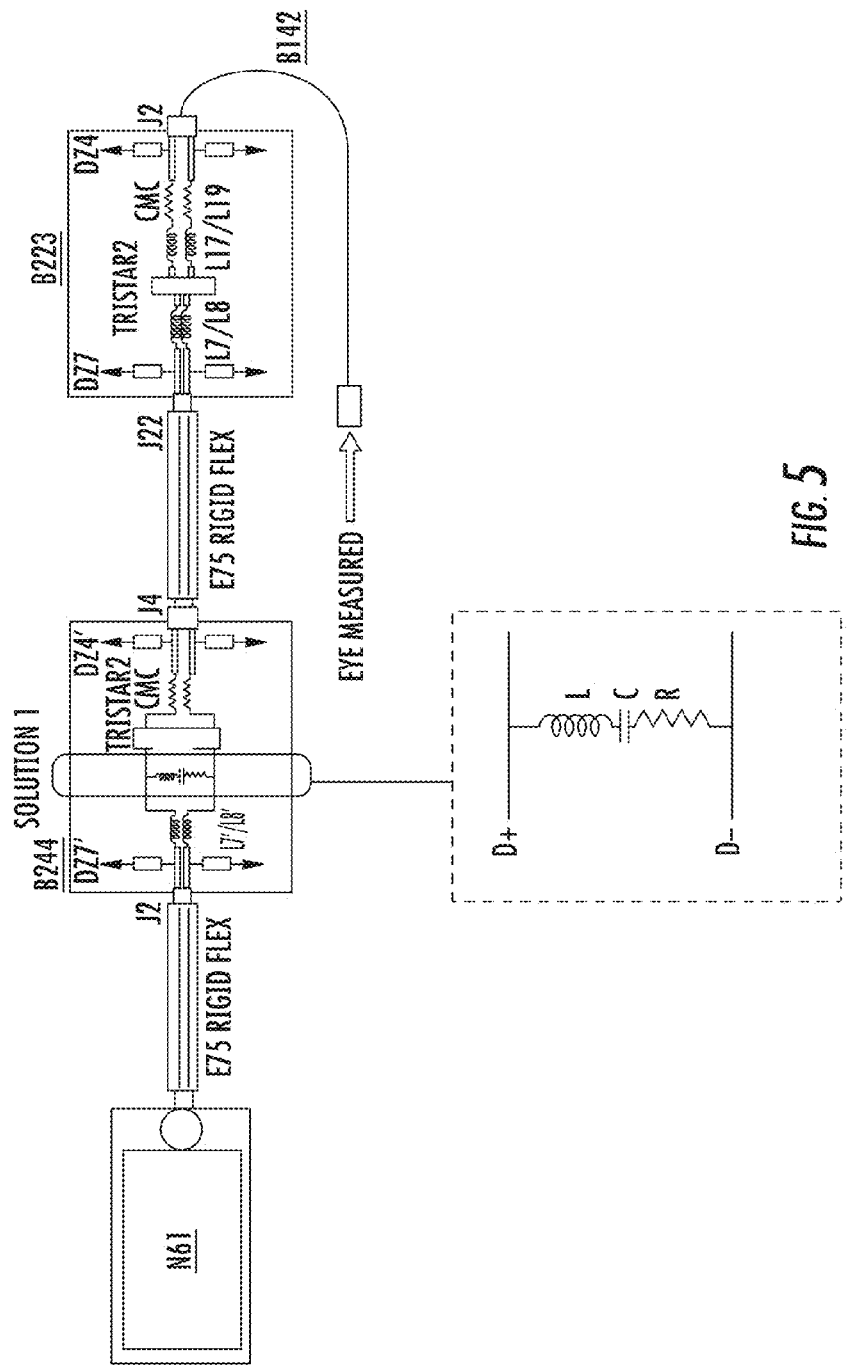
FIG. 5 is a graphical representation of one exemplary embodiment of a resistive-inductive-capacitive (RLC) passive equalization circuit.
Figure 5A:
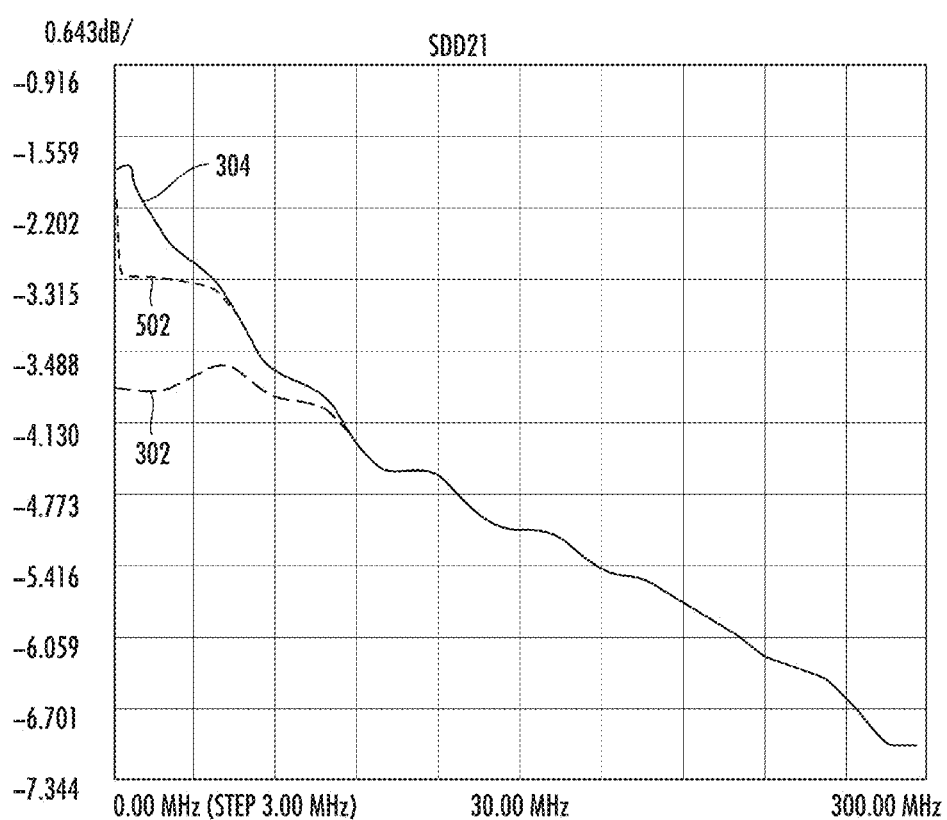
FIG. 5A is a graphical representation of the frequency response of the resistive-inductive-capacitive (RLC) circuit of FIG. 5.

To these ends, one exemplary embodiment of a resistive-inductive-capacitive (RLC) passive equalization circuit is illustrated in FIG. 5. As shown, the passive equalization circuit includes one resistor, one inductor, and one capacitor which are connected between the Universal Serial Bus (USB) differential cabling lines (D+, D−). FIG. 5A illustrates the frequency response 502 of the foregoing circuit with a resistor of 500Ω, an inductor of 4.5 uH, and a capacitor of 500 picoFarads (pF); For comparison, the frequency response 302 of USB cabling with the exemplary RL circuit of FIG. 3A and the frequency response 304 of the prior art cabling without passive equalization is also shown.

Unlike an inductor, a capacitor behaves as a very high impedance/open circuit at low frequencies/DC (i.e., effectively disconnecting the shunt). As shown in FIG. 5A, at very low frequencies (near DC), the capacitor dominates the circuit impedance, bringing the insertion loss close to the insertion loss of the prior art cabling frequency response 304. At moderate frequencies, the inductor and capacitor both contribute to the circuit impedance, providing a flattened frequency response (which is slightly narrower than the frequency response 302 of the exemplary RL circuit described above). At high frequencies, the inductor dominates the circuit frequency.

More directly, the RLC passive equalization circuit strikes a balance between preserving very low frequency (e.g., DC) insertion loss characteristics (so as to enable Full Speed enumeration), while at the same time providing some degree of frequency response flattening to improve overall signal integrity during USB High Speed (HS) data transactions.

Figure 5B:
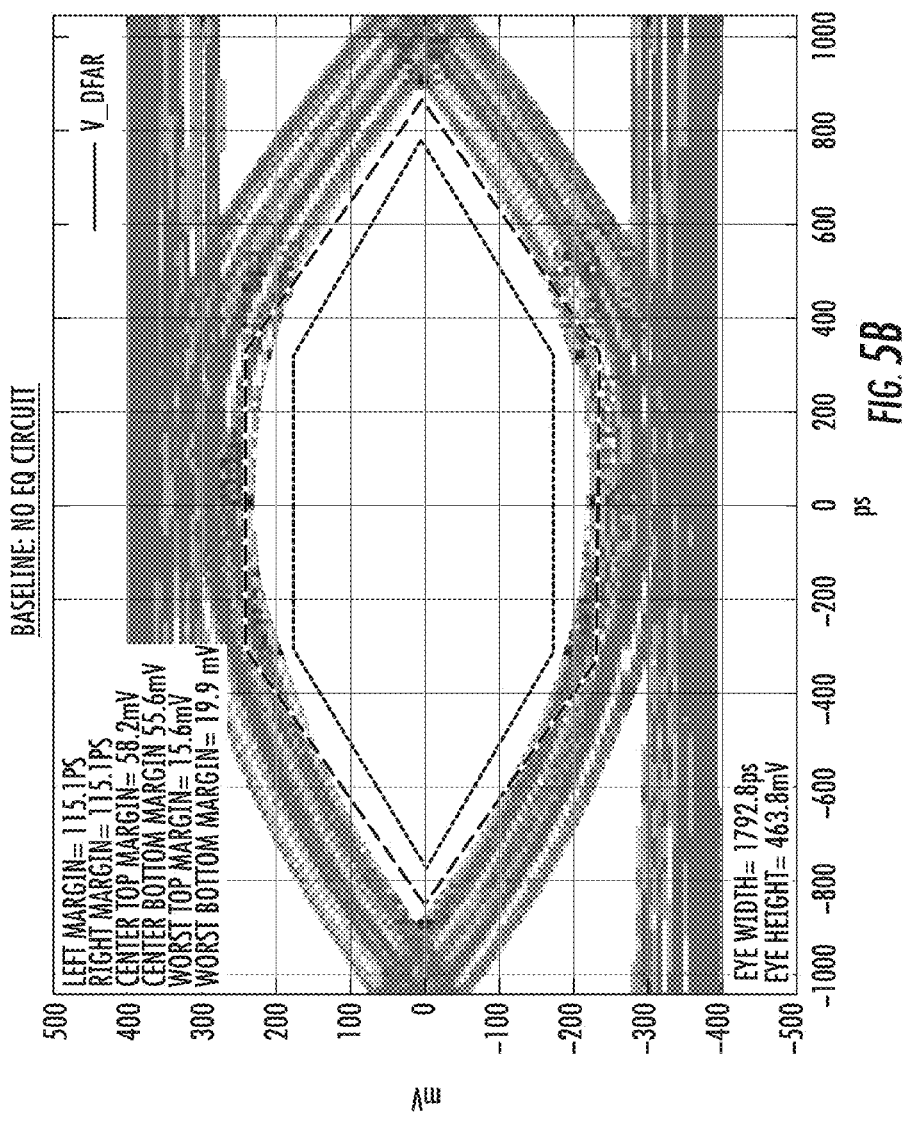
FIG. 5B is a graphical representation of the eye diagram corresponding to the exemplary RLC passive conditioning coupling of FIG. 5 at High Speed (HS).
Figure 5B:
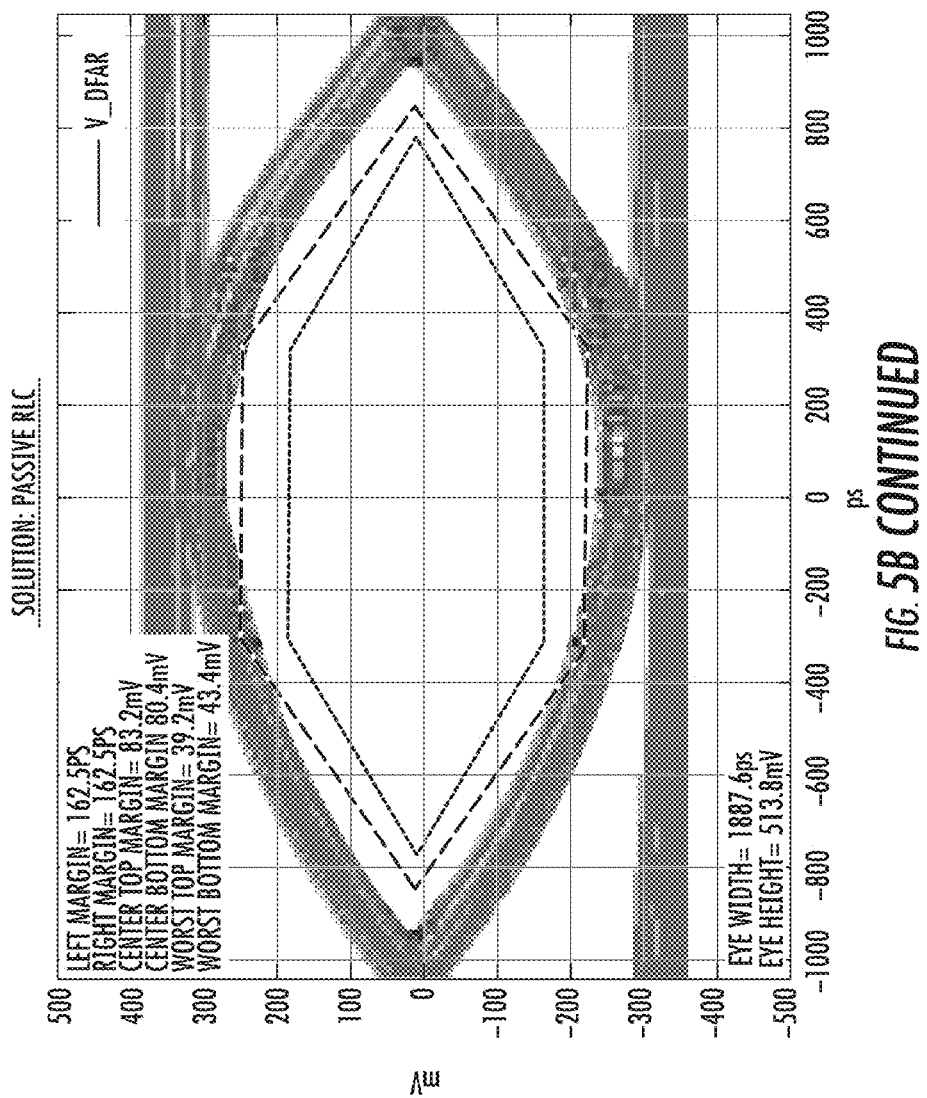
Figure 5C:
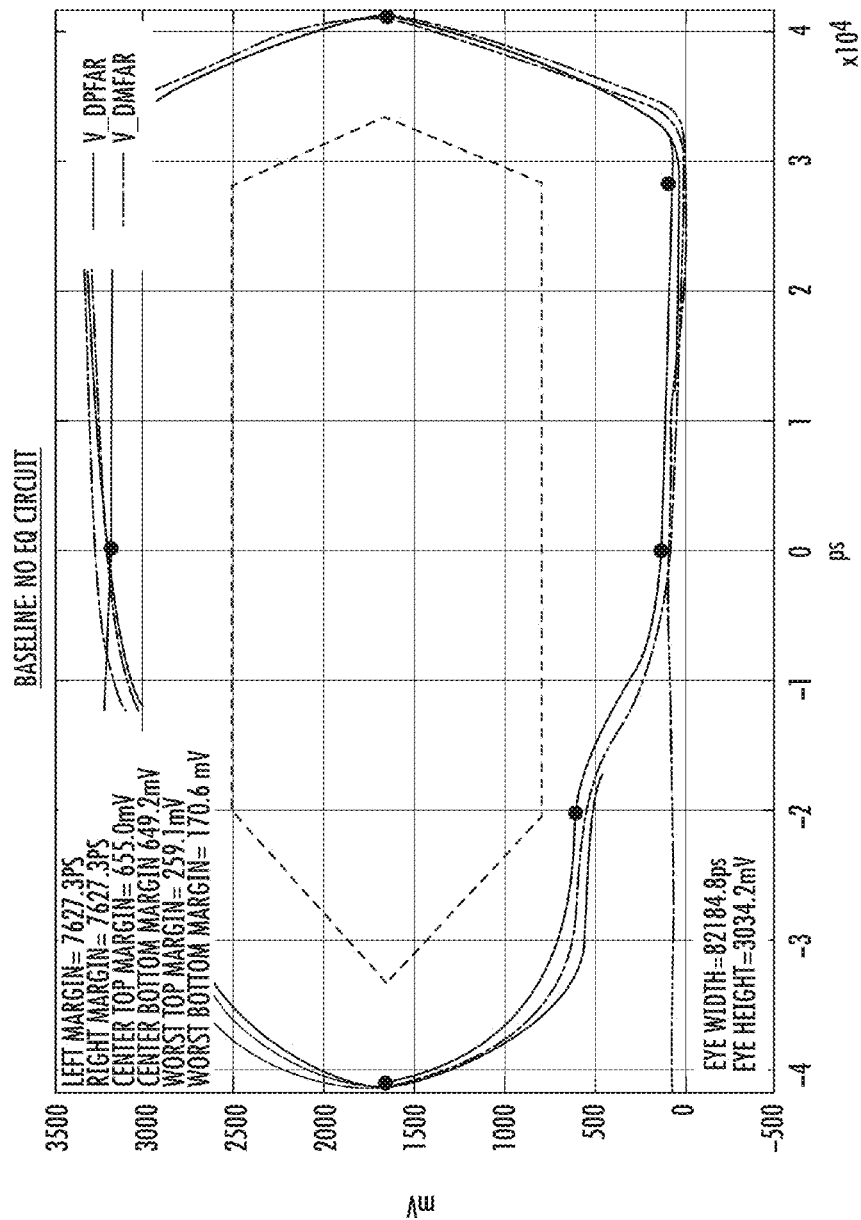
FIG. 5C is a graphical representation of the eye diagram corresponding to the exemplary RLC passive conditioning coupling of FIG. 5 at Full Speed (FS).
Figure 5C:
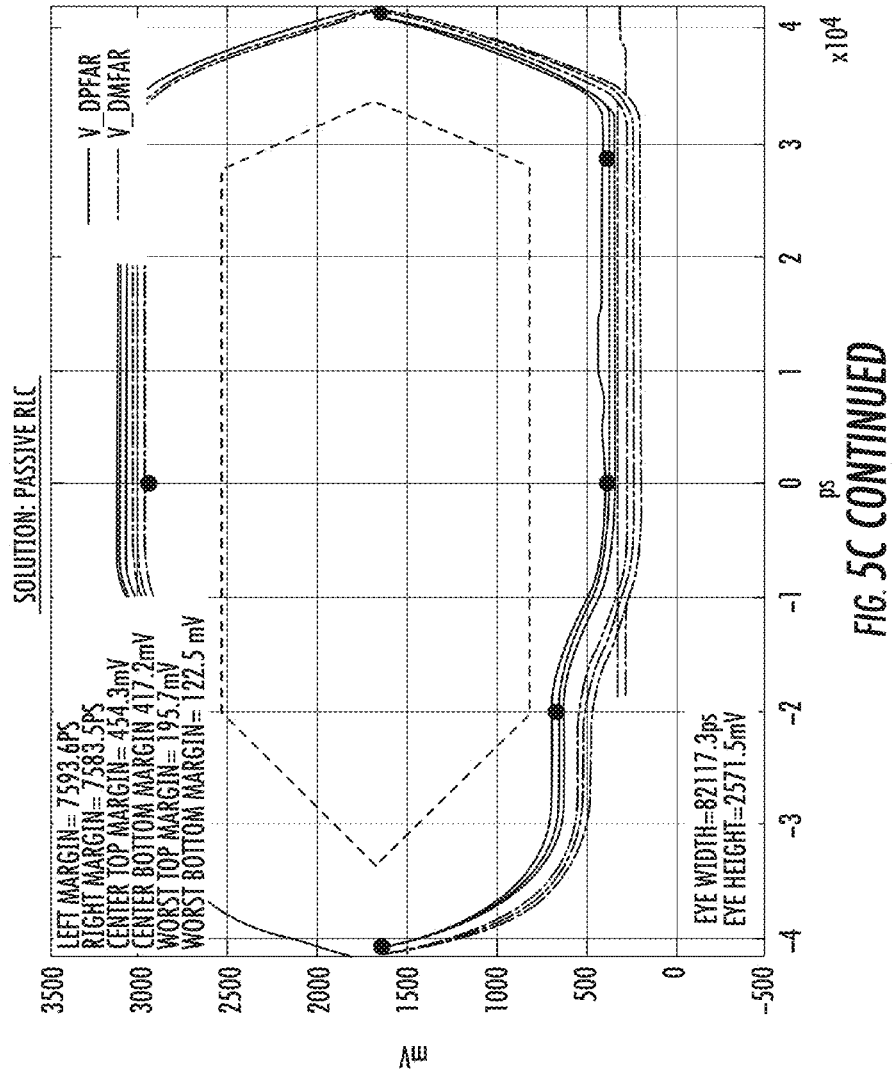

FIG. 5B illustrates simulated eye masks, as measured at the connection point between the cable and the peripheral USB device, with and without the exemplary RLC passive equalization circuit, for High Speed operation in Device Mode. As summarized in the table, there is a 95 picosecond (ps) improvement in timing margin, and a 47.1 milliVolt (mV) improvement in the worst point eye height. FIG. 5C illustrates simulated eye masks, as measured at the connection point between the cable and the peripheral USB device, with and without the exemplary RLC passive equalization circuit, for Full Speed operation in Device Mode. As shown, there is slight improvement to timing margins, but a reduction in performance of the worst point eye height margin; even so, the exemplary RLC passive equalization circuit satisfies the eye mask requirements of USB Full Speed operation.

Figure 6:
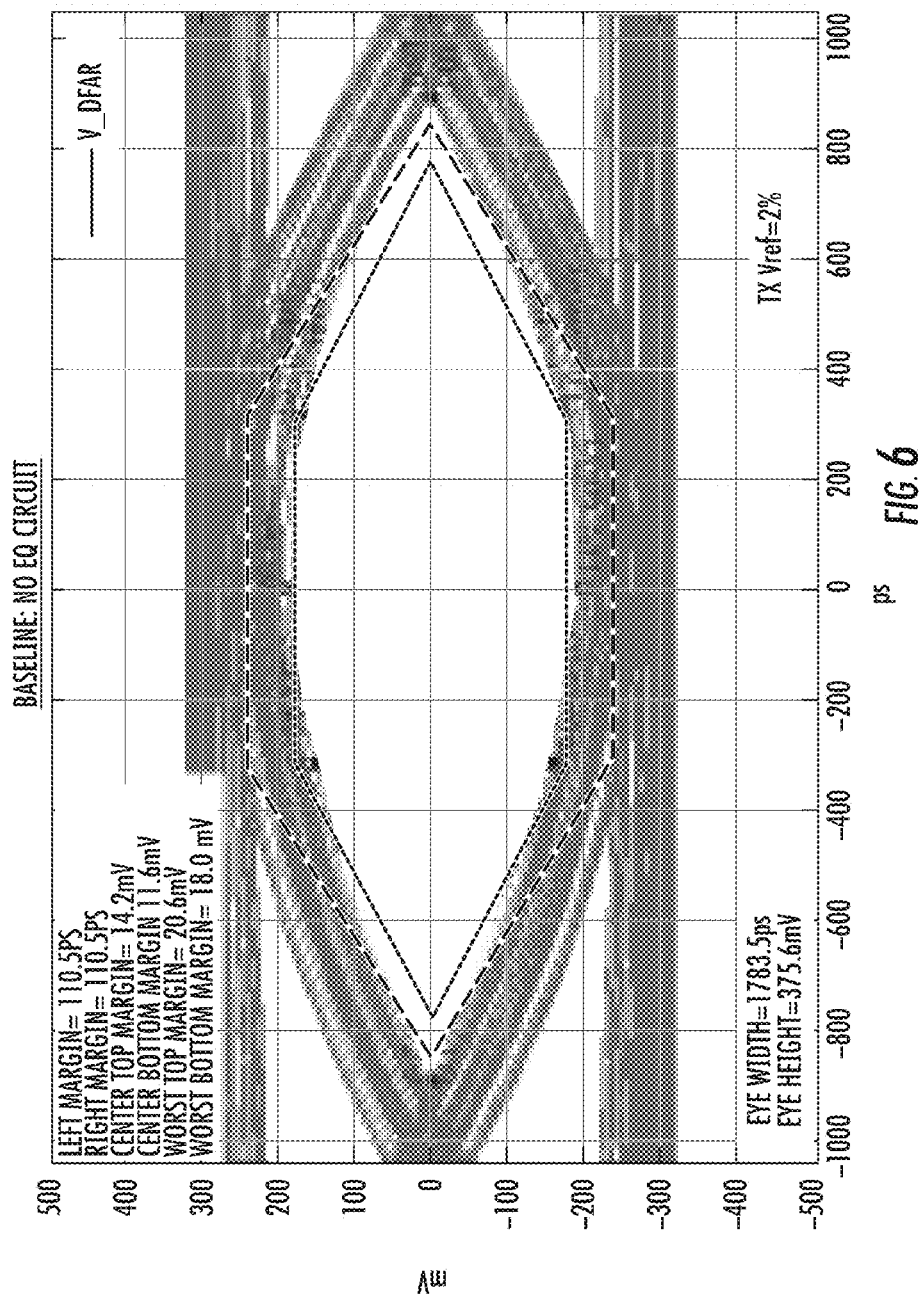
FIG. 6 shows simulated eye masks, as measured at the connection point between the cable and the peripheral USB device, both with and without the exemplary RLC passive equalization circuit, for High Speed operation in Host Mode.
Figure 6:
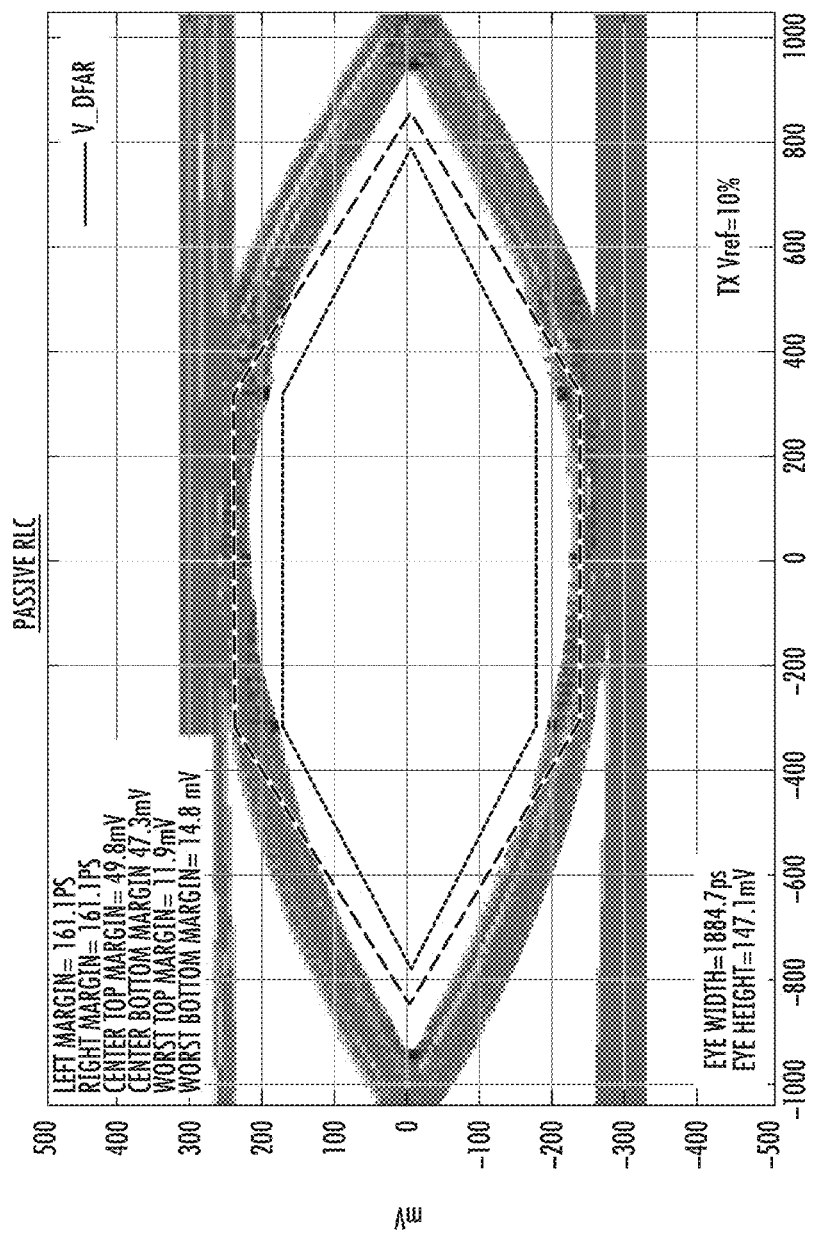

FIG. 6 illustrates simulated eye masks, as measured at the connection point between the cable and the peripheral USB device, both with and without the exemplary RLC passive equalization circuit, for High Speed operation in Host Mode. As summarized in the table, there is a 101 ps improvement in timing margin, and a 64 mV improvement in the worst point eye height. The improvements to timing and voltage margins sufficiently open the eye to acceptable clearances, with respect to the eye mask.

More generally, various embodiments of the exemplary passive equalization circuit provide multiple advantages over existing solutions with inexpensive commodity components (e.g., resistors, inductors, and capacitors). In one exemplary embodiment, the exemplary RLC passive equalization circuit is tuned to increase vertical eye openings (e.g., resulting in improved voltage margins) and horizontal eye openings (e.g., resulting in improved timing margins). Increased voltage and timing margins result in manufacturing yield improvements, robust connectivity (e.g., better customer experience).

Those of ordinary skill in the related arts will readily appreciate that the passive nature of the disclosed embodiments offers additional benefits over e.g., active solutions. For example, passive solutions are lower cost than active solutions, take less space, and do not require additional power to operate.

Connectivity Detection Improvements—

As previously noted, the aforementioned exemplary passive equalization circuits trade insertion loss for a flatter frequency response, thereby improving signal fidelity at higher frequencies (and corresponding data rates). However, another subtle benefit of the exemplary passive equalization circuit is that higher insertion losses may actually benefit certain cable sensing technologies. As a brief aside, certain technologies actively sense signaling voltages to monitor channel operation (not just data). For example, within the context of transmission line theory, properly terminated signal traces are configured to reduce the effects of reflections. Reflections occur where an electrical signal traveling via a transmission line hits an impedance mismatch; the reflected portion of the electrical signal will return and depending on phase may constructively or destructively interfere with the original electrical signal. Common examples of impedance mismatches include e.g., poor connectivity, cable breaks, cable shorts, etc.

Within the context of USB, the USB host actively senses changes in voltage (which reflect a change in impedance) to determine when a connected USB device has been disconnected. Specifically, USB host devices will automatically disconnect a USB device when the signaling voltage exceeds a "squelch" threshold. Under normal operation, the USB host expects the signaling lines to have a termination of 45Ω; however, when the USB device (which has a matching impedance) is disconnected, the resulting open circuit has an infinite impedance. This impedance mismatch causes electrical signals to reflect back into the USB host transceiver and constructively interfere at the USB host. The squelch threshold is configured to detect this constructive interference.

One empirically observed problem with the USB squelch circuit is that it cannot distinguish between reflections and actual transmit signaling. In other words, the squelch circuit can only detect when the threshold is breached. Thus, the USB transmitter must limit transmit power to ensure that it does not inadvertently trip the squelch circuit. Unfortunately, increasing transmit power is the traditional remedy for poor signal integrity; thus, the maximum transmit power limit imposed by the USB squelch circuit imposes a hard cap on such solutions.

Figure 7:
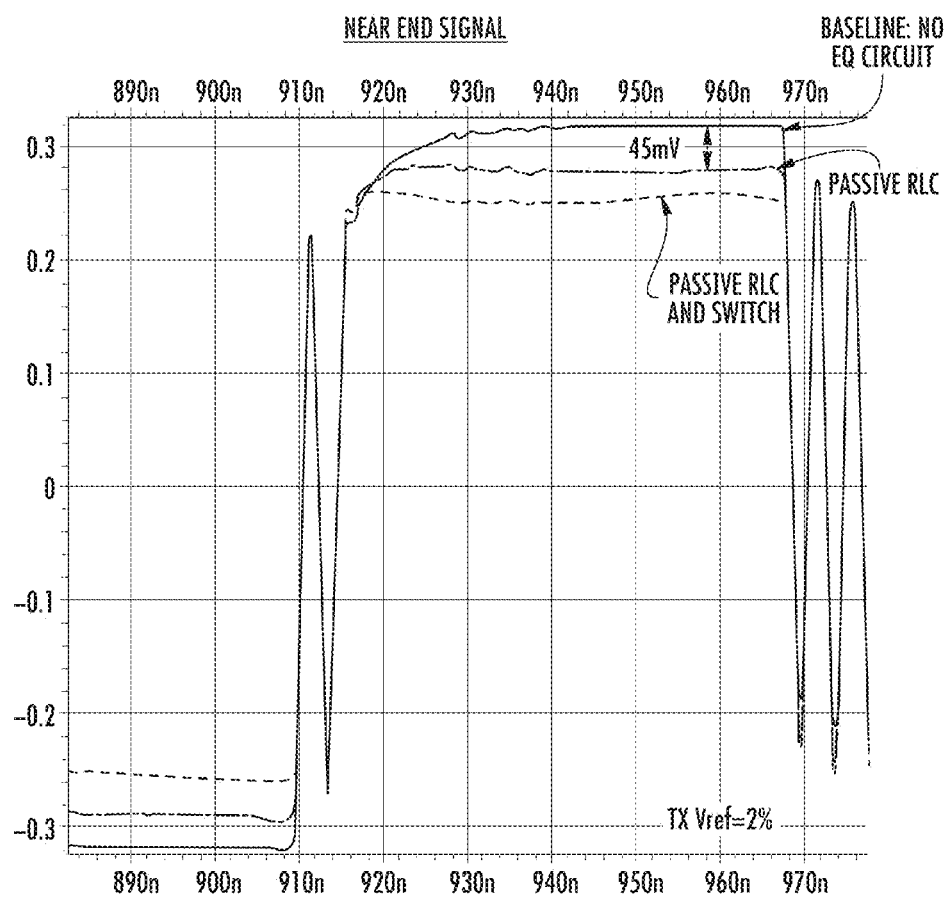
FIG. 7 shows the USB HS operation transmit swing level decrease as observed at the USB host device transmitter Medium Access Control (MAC) circuitry.

Referring back to the exemplary passive equalization circuits, the increased insertion loss at DC decreases the voltage level at the USB host. For example, FIG. 7 depicts the USB High Speed operation transmit swing level decrease as observed at the USB host device transmitter Medium Access Control (MAC) circuitry. As shown, the exemplary passive equalization circuit effectively reduces the voltage levels at the transmit output with the same transmit setting. In practice, the reduced voltage level allows the transmitter to increase the transmit swing setting from an electrical current swing of 2% to 10% without increasing the voltage level. More directly, by increasing the transmit current while reducing voltage swing, the total transmit power (across all frequencies) can be increased without falsely triggering the squelch circuit.

While the host mode transmit swing level benefits are maximized when the exemplary passive equalization circuit is in close proximity to the transmit circuit (i.e., so as to prevent the squelch circuit from false disconnection), the connected device is not sensitive to the location of the passive equalization circuit. Thus, some variants may place the passive equalization circuit farther from the transmit circuit where such considerations are less of a factor (e.g., where there is no squelch circuit, etc.)

Artisans of ordinary skill in the related arts, given the contents of the present disclosure, will readily appreciate that the exemplary passive equalization circuit can be tuned to affect detection thresholds for a range of voltage and/or current sensing circuitry. Accordingly, by tuning the passive equalization circuitry, voltage and/or current sensing circuitry can be made more or less sensitive, as desired. Common examples of such applications include e.g., over-voltage/over-current protection, hot-plug detection, power detection, etc.

Exemplary Apparatus—

Figure 8:
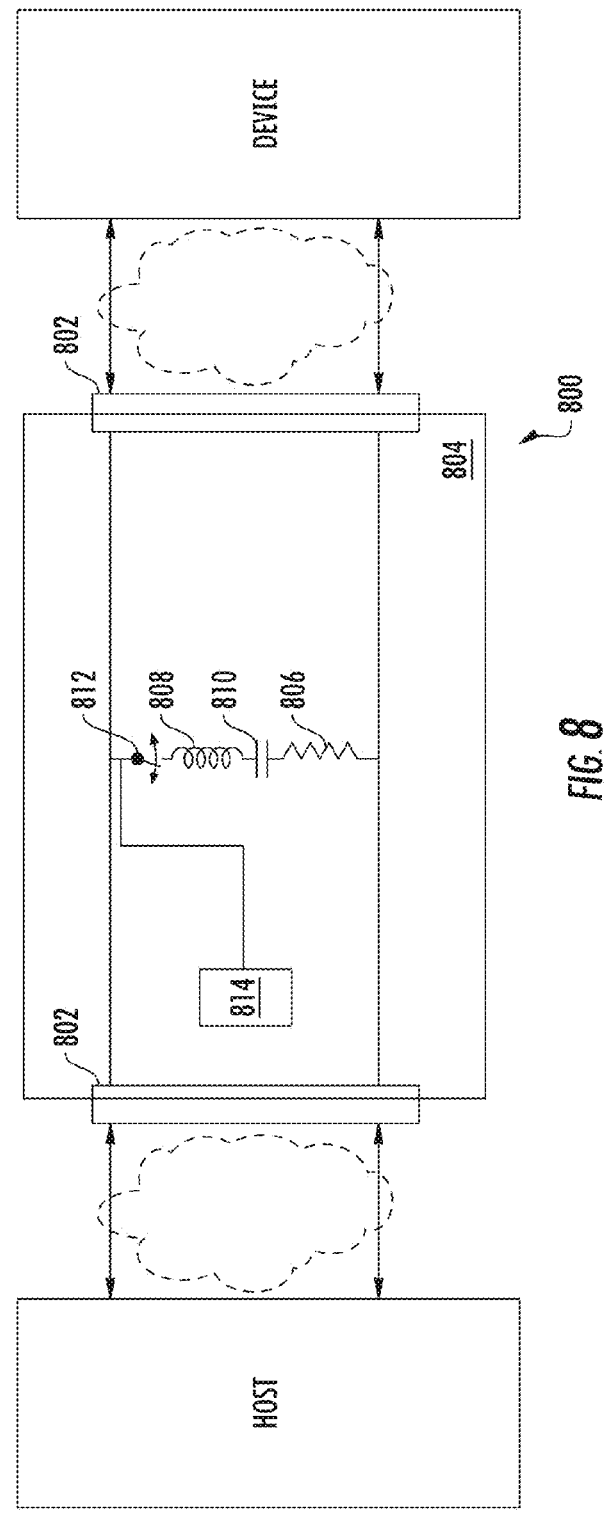
FIG. 8 is a logical block diagram of one exemplary apparatus consistent with the principles described herein.

Referring now to FIG. 8, one exemplary apparatus configured to equalize a high speed serial bus is disclosed. As shown, the exemplary apparatus 800 includes one or more pairs of differential terminals 802 which are coupled together with a shunting circuit 804. In one exemplary embodiment, the exemplary apparatus 800 further includes one or more power terminals, ground terminals, single ended signal terminals, etc. In some variants, the single ended signals may be multiplexed onto the one or more pairs of differential terminals 802. It is readily appreciated that various aspects of the present disclosure may be used in a variety of contexts including e.g., rigid flex cables, Printed Circuit Board (PCB) manufacturing, component interconnects etc.

In some embodiments, the exemplary apparatus 800 is an intermediary "dongle", adaptor, relay, etc. configured to provide signal conditioning between at least two devices (as shown a host and a device). Those of ordinary skill in the related arts will further appreciate that the exemplary apparatus 800 may be located between multiple other intermediary elements (e.g., powered or unpowered hubs, cable extensions, etc.) In other embodiments, the exemplary apparatus 800 is a cable configured to directly connect at least two devices. Still other embodiments of the present disclosure may incorporate the exemplary apparatus 800 as a portion of a transceiver of a larger device, etc.

One exemplary embodiment of the exemplary apparatus 800 is mechanically and/or electrically configured for use with a USB 2.0 compliant interface as described within the Universal Serial Bus Specification, Revision 2.0, published Apr. 27, 2000, incorporated by reference in its entirety. As described therein, the USB 2.0 interface includes four (4) terminals (VUSB, D+, D−, GND), and supports a higher maximum signaling rate of 480 Mbit/s called High Speed (HS), in addition to the earlier USB (e.g., USB 1.0, USB 1.1, etc.) Full Speed (FS) signaling rate of 12 Mbit/s.

Those of ordinary skill in the related arts will readily appreciate that the various principles for using tuned passive equalization described herein may be used to remedy any high frequency differential signaling that suffers from reflections introduced by impedance discontinuities (such as connectors, etc.). For example, another exemplary embodiment of the exemplary apparatus 800 is mechanically and/or electrically configured for use with a USB 3.0 compliant interface as described within the Universal Serial Bus 3.0 Specification, Revision 1.0, published Jun. 6, 2011, incorporated by reference in its entirety. As described therein, the USB 3.0 interface includes a functional USB 2.0 interface, as well as a USB Super Speed (SS) interface that includes both a transmit differential pair (SS_TX+ and SS_TX−), and a receive differential pair (SS_RX+ and SS_RX−).

As a brief aside, impedance is the mathematical ratio of voltage to current, as expressed as a resistance and a complex reactance, which when combined result in a magnitude and phase. The magnitude of the complex impedance is the ratio of the voltage amplitude to the current amplitude; similarly the phase of the complex impedance is the phase shift by which the current lags or leads the voltage.

As used herein, the term "resistor" describes a passive two terminal linear electrical component that is characterized by a voltage difference across the two terminals that is directly proportional to the amount of current passed across the two terminals. An ideal resistor does not change its operation as a function of the frequency of the input voltage.

As used herein, the term "capacitor" describes a passive two terminal linear electrical component that passes current across the two terminals directly proportional to the change in the amount of voltage across the two terminals. In the frequency domain, the impedance of an ideal capacitor decreases inversely with frequency. Thus, at high frequencies, a capacitor presents low impedance to the input voltage; at low frequencies a capacitor presents high impedance.

As used herein, the term "inductor" describes a passive two terminal linear electrical component characterized by a voltage difference across the two terminals that is proportional to the change in the amount of current passed through the inductor. In the frequency domain, the impedance of an ideal inductor increases proportionately with frequency. Thus, at high frequencies, an inductor presents high impedance to the input voltage; at low frequencies an inductor presents low impedance.

While the linear circuit components (resistor, capacitor, and inductor) are described and treated herein as ideal components, it is appreciated that actual components have small parasitic values. For example, actual capacitors have some parasitic equivalent series resistance (ESR) and some parasitic equivalent series inductance (ESL).

While the present disclosure is discussed with reference to linear passive circuits, it is readily appreciated by those of ordinary skill given the contents of the present disclosure, that the various techniques and principles described herein may be readily applied to non-linear and/or active circuits. Common examples of non-linear and/or active circuits include without limitation: operational amplifiers (op-amps), diodes, triodes, transistors, integrated circuits (ICs), In one exemplary embodiment, the shunting circuit 804 is characterized by a "shunting" impedance. While the illustrated embodiment illustrates the shunting circuit 804 with components which are arranged in series, those of ordinary skill will readily appreciate that the physical and/or electrical properties of the shunting circuitry may be readily adapted for a range of applications without departing from the various aspects of the present disclosure. For example, the shunting circuit 804 may also incorporate components connected in series, parallel, or a combination thereof.

The aforementioned examples (e.g., as described in Exemplary Passive Conditioning, above) have been illustrated with specific values (e.g., resistor, capacitor, and inductor values), however the impedance is a function of the cable path. In other words, the impedance may change depending on e.g., cable length, intermediary connectors, connection speed, bus functionality (e.g., host mode, device mode), etc. Accordingly, in one exemplary embodiment, the shunting circuit 804 is directed to enabling and/or switching between one or more tuned impedances based at least in part on the current usage scenario. As shown, the shunting circuit 804 includes one resistor 806, one inductor 808, and one capacitor 810 which are selectively connected between the Universal Serial Bus (USB) differential cabling lines (D+, D−) based on a switch 812. The switch is driven by switch logic 814 which may be implemented via dedicated hardware logic, software (executed via a processor), etc.

As used herein, the term "switch" describes a multiple terminal component characterized that is configured to make or break an electrical circuit between various ones of the multiple terminals. Typically, any two or more terminals can be in one of two states: either "closed" meaning the terminals are connected and electricity can flow between them, or "open", meaning the terminals are separated and the switch is non-conducting. Common examples of switches include e.g., single pole single throw (SPST) which is configured to open or close a circuit, single pole double throw (SPDT) which is configured to open a first circuit and close a second circuit (and vice versa). Other common switches include e.g., double pole single throw (DPST), double pole double throw (DPDT), etc. However, those of ordinary skill in the related arts will readily appreciate, given the contents of the present disclosure, that virtually any switch type may be used e.g., N-pole M-throw (e.g., N switches with M possible connections).

In one exemplary embodiment of the present disclosure, the switch 812 is closed (i.e., connecting the passive equalization circuitry) for USB HS operation (i.e., where the cabling is not optimized for USB HS operation), and opened for all other speeds (e.g., USB FS and other USB modes). In an alternative example, the switch 812 is closed for USB FS Enumeration, and open for all other operations (i.e., where the cabling itself may already be optimized for the appropriate operational mode). In other embodiments, the switch 812 may selectively connect or disconnect one or more different shunting impedances, based on the applicable frequency and/or protocol requirements. More generally, it is appreciated that any one of a number of tuned shunting impedances may be connected or disconnected based on transaction speed, operational mode, etc.

In another exemplary embodiment of the present disclosure, the switch 812 is configured to select among a plurality of different tuning impedances. In some cases, the different tuning impedances may correspond to cable lengths, connected accessories, etc. For example, in some embodiments, the switch logic 814 may be configured to determine the cable lengths and/one or more connected accessories, and determine based on that information, the appropriate tuning impedance. For example, a default tuning impedance may be matched to cable lengths of 3 meters (or less) and a single USB accessory; however a special use tuning impedance may be matched to cable lengths in excess of 3 meters, and/or specialized or proprietary accessories (e.g., car adaptors, etc.).

In one embodiment, the switch logic 814 is embodied as a set of computer-readable instructions configured for execution by a processor. A processor subsystem may include e.g., a digital signal processor, microprocessor, or plurality of processing components mounted on one or more substrates. In some embodiments, certain specialized processing elements may be incorporated to further improve overall device performance. In certain designs, one or more multimedia codecs (i.e., encoder, decoder) augment or offload processing from the general purpose processor. For example, a transceiver logic may offload transactional processing from the main processor.

The processing subsystem may be connected to a computer-readable media subsystem including memory which may for example, include RAM, SRAM, flash, SDRAM, etc. components. The memory subsystem contains computer-executable instructions which are configured for execution by the processor subsystem. In one exemplary embodiment, the memory subsystem may further include long term memory storage (e.g., non-volatile memory). Long term memory storage may be useful to e.g., store computer-executable instructions, store user progress, user history and preferences, multimedia files, etc. Examples of long term memory storage include for example flash, and hard disk drives, etc.

In some variants, the switch logic 814 may be executed from within an operating system (OS) driver. In other variants, the switch logic 814 may be executed from within a higher level application (e.g., $3^{rd}$ party software bundled that supports a proprietary adaptor and/or use scenario). Still other embodiments may incorporate switch logic 814 within the device firmware (e.g., software that is embedded and/or burned within the lowest layers of the device software).

In some complex implementations, the switch logic 814 may be further coupled to a digital communications bus that is configured to enable cabling discovery processes. More directly, the various devices and/or intermediary relays may respond and identify their presence on a cabling connection so as to enable the switch logic 814 to determine the appropriate shunting impedance. For example, a USB bus that is "daisy-chained" through multiple extension cables and/or hubs may discover the device present for each of the independent "hops" and determine the appropriate shunting impedance therefrom. In some such implementations, the digital communications is multiplexed over the bus. For example, in one such embodiment, a USB bus may perform device discovery (e.g., over a FS communications link) before configuring itself for an appropriate shunting circuit to support HS operation. In other embodiments, the digital communications bus is a distinct bus; common examples of such buses include without limitation: Inter Integrated Circuit (I2C), general purpose input/output (GPIO), etc.

In some embodiments, the switch logic 814 may be implemented within dedicated hardware logic. Common examples of hardware based logic include without limitation field-programmable gate array (FPGA), programmable logic devices (PLDs), system on a chip (SOC), application specific integrated circuits (ASIC), etc.

In some embodiments, the switch logic 814 may incorporate analog detection circuitry. For example, in some embodiments the switch logic 814 may use band-gap comparators or window comparators to determine when transmit (or return) voltage is within a certain range (between two or more thresholds). In other such examples, the switch logic may use phase locked loops (PLLs), digital locked loops (DLL), and/or frequency locked loops (FLLs), to estimate the amount of drift and/or jitter. One or more of these measurements may be used by the switch logic 814 to infer the likelihood of eye mask incursions without actual measurement. Based on such inferences, the switch logic 814 may select whether and/or which shunting circuit to connect.

Similarly, the switch logic 814 may be configured to "sniff" ongoing transactions to determine current operational modes. For example, in some cases, an FPGA may be configured to determine whether a USB bus is operating in FS or HS mode based on sniffing USB packet traffic. While sniffing generally refers to any software or hardware entity that is configured to log intercept and log digital traffic, typical sniffing does not require that the data is decoded, merely that certain patterns can be recognized. For example, a packet sniffer may detect the presence of packet headers, and/or certain special symbols or packet types. Other common "sniffers" include e.g., bit error rate detection, symbol error rate detection, frame error rate detection, block error rate detection, etc.

In one aspect of the present disclosure, multiple shunting impedances have various characteristics which may or may not be desirable for a number of reasons. For example, different impedance circuits may be characterized by e.g., insertion loss, frequency response, power consumption, signal distortion, etc. Consequently, the switch logic 814 may take into consideration a multitude of factors when selecting an appropriate impedance. For example, certain applications may favor a more optimal frequency response over less insertion loss, etc. Still other applications may have specific limitations which are inflexible; for example, there may be maximum insertion losses which can be tolerated before the link is unrecoverable.

Method—

Figure 9:
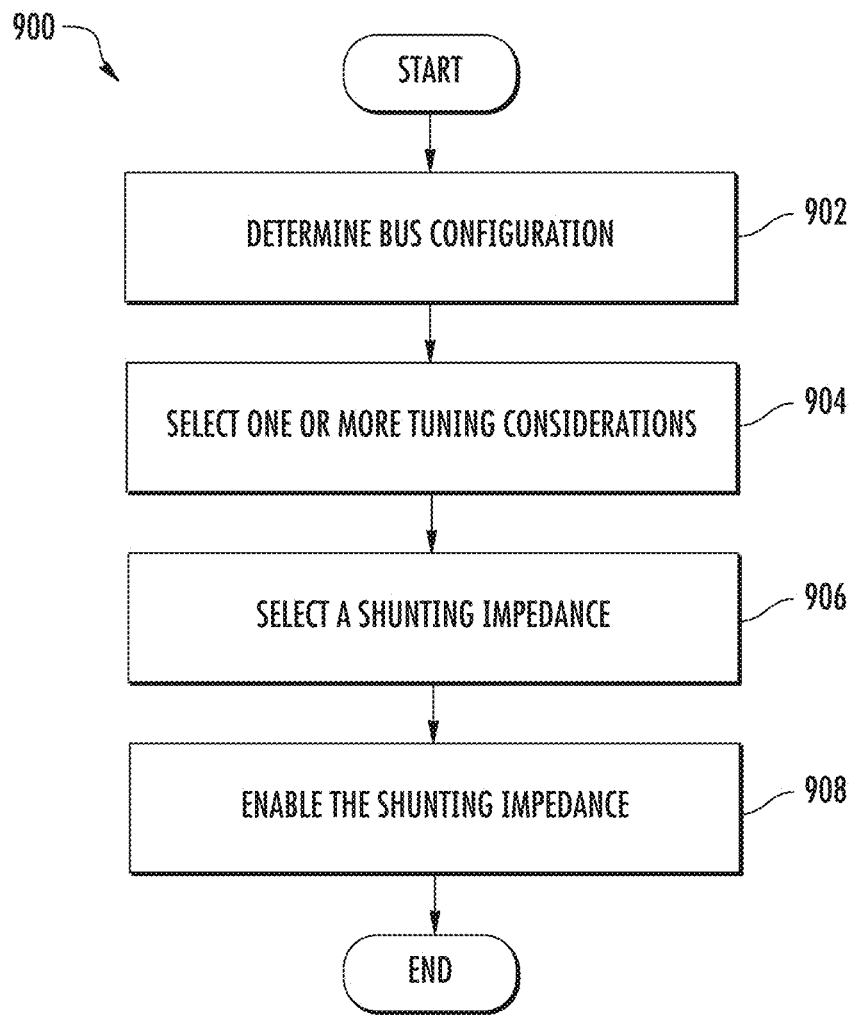
FIG. 9 is a logical block diagram of one generalized method consistent with the principles described herein.

Referring now to FIG. 9, one generalized method 900 for equalizing a high speed serial bus is disclosed.

In one embodiment, the high speed serial bus includes a Universal Serial Bus (USB) compliant bus. Other common examples of high speed serial buses include without limitation, FireWire, Thunderbolt, High Definition Multimedia Interface (HDMI), DisplayPort, etc.

In one embodiment, the high speed serial bus includes one or more differential terminals. In one embodiment, the high speed serial bus additionally includes one or more single-ended signals. In some implementations, the one or more single-ended signals are multiplexed on the one or more differential terminals.

In one embodiment, the high speed serial bus is configured to be passively extended and/or split. In some cases, each extension and/or split is characterized by a resulting impedance mismatch due to e.g., manufacturing tolerances, device construction, inherent design limitations, etc.

At step 902 of the method 900, a bus configuration is determined. In one embodiment, the bus configuration is based on one or more physical parameters. Common examples of physical parameters include without limitation: cable length, transmit power (voltage and/or current), transmit swing level, data rate, clock rate, the number of connected devices, network topology, etc.

In one embodiment, the bus configuration is based on an operational mode and/or communication protocol. Operational protocols may themselves also configure various physical parameters. For example, within the context of USB 2.0 devices, the host and device may negotiate to transact data according to Low Speed, Full Speed (FS), and High Speed (HS). Other examples of operational modes include without limitation: scrambling (or lack thereof), parity (or lack thereof), transmission speed, data rates, emissions reduction signaling and/or line coding (e.g., Transition Minimized Differential Signaling (TMDS), 8B10B encoding, etc.). More generally, artisans of ordinary skill will readily appreciate the wide variety of different encoding and signaling techniques which are used to minimize noise, reduce interference, improve signal strength, maximize data, improve latency, improve throughput, etc.

In one embodiment, the bus configuration is based on one or more devices which are connected to the bus. In particular, certain devices may be manufactured with limited uses or with limited compatibility. In other cases, proprietary devices may be designed so as to specifically operate within limited uses and/or limit operation when not in conjunction with other proprietary devices.

In some cases, the bus configuration is determined based on negotiations or communications conducted via a digital communications bus. In certain such variants, the negotiations or communications are conducted during a discovery phase. In other variants, the bus configuration is constantly monitored. In some cases, the bus configuration is inferred based on specific physical characteristics, such as voltage thresholds, clock rates, etc. In still other embodiments, the bus configuration may be provided in an out-of-band manner (e.g., via user input or applications software, etc.)

At step 904, one or more tuning considerations are selected. Common examples of tuning considerations include e.g., signal integrity, power consumption, customer preference, overall customer experience, etc. Common examples of signal integrity considerations include without limitation: insertion loss, frequency response, bit error rate, block error rate, symbol error rate, frame error rate, inter-symbol interference (ISI), etc.

In some cases, tuning considerations may be specified and/or limited by a particular application or activity. For example, a software application may only support a specific device or network configuration; in other examples, a software application may require specific device performance.

Tuning considerations may be absolute or relative. Specifically, certain requirements are absolute requirements which cannot be violated. Some tuning considerations may only be factors, which must be weighed relative to various other factors in order to optimize the most desirable selection. Tuning considerations may be further informed based on other considerations, for example historic usage, desired performance, etc.

At step 906, a shunting impedance is selected based on the bus configuration in consideration of the one or more tuning factors. In some embodiments, the one or more tuning factors may be maximized or minimized by the shunting impedance. In other embodiments, multiple factors may be weighed as an aggregate to determine the optimal shunting impedance. In still other embodiments, the available shunting impedances may be evaluated with respect to the one or more tuning factors in order to determine the best fit from the available options.

In some embodiments, the selection may be based on historic performances. For example, in some cases, logging software may track historic performance for a set of bus configurations and corresponding shunting impedances. In some cases, historic log information may be provided by the devices themselves, or via some external party (e.g., via a network entity, via manufacturer patches, etc.). In some cases, the selection of the shunting impedance may be dynamically adjusted as performance changes; for example, in some cases a first shunting impedance is tried, and if performance is inadequate then subsequent shunting impedances are tried.

In some embodiments, the selection may be overridden. For example, higher layers application software and/or user input may be used to directly control shunting impedances.

At step 908, the selected shunting impedance is enabled.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A signal conditioning apparatus, comprising:
a first cable interface comprising a differential pair;
a second cable interface comprising the differential pair;
wherein the differential pair comprises a positive and a negative terminal that are coupled to one or more peripheral devices via a shunting circuit, the shunting circuit comprising a resistor and an inductor; and
wherein the shunting circuit is configured to present a high impedance between the positive and negative terminals at a first frequency and provide a first insertion loss during enumeration operations of the one or more peripheral devices, and further configured to provide a second insertion loss between the positive and negative terminals at a second frequency during a data transaction operation with the one or more peripheral devices, the second frequency differing from the first frequency, the shunting circuit enabling the first insertion loss during the enumeration operations of the one or more peripheral devices to be lower than the second insertion loss during the data transaction operation of the one or more peripheral devices.

2. The signal conditioning apparatus of claim 1, wherein the shunting circuit additionally comprises a switch element configured to open and close the shunting circuit.

3. The signal conditioning apparatus of claim 2, wherein the switch element is configured to open the shunting circuit during the enumeration operations and close the shunting circuit during the data transaction operation.

4. The signal conditioning apparatus of claim 1, wherein the shunting circuit is further configured to flatten an attenuation over an increased frequency range as compared with a similar signal conditioning apparatus without the shunting circuit.

5. The signal conditioning apparatus of claim 4, wherein the attenuation does not exceed 3 decibels (dB) over the increased frequency range of 300 Megahertz (MHz).

6. The signal conditioning apparatus of claim 5, wherein the differential pair comprises Universal Serial Bus (USB) D+ and D− terminals.

7. A signal conditioning apparatus, comprising:
a differential pair that comprises a positive and a negative terminal that are coupled via a shunting circuit;
wherein the shunting circuit comprises at least a switch element, the shunting circuit further comprising a resistor and an inductor; and
wherein the shunting circuit is configured to alter a frequency response of the differential pair for at least one mode of operation, the alteration of the frequency response comprising a selection among a plurality of tuning impedances based on a data transaction mode determined by logic associated with the switch element, the determination being based on ongoing packet traffic occurring via the differential pair.

8. The signal conditioning apparatus of claim 7, wherein the alteration further comprises an increase in an insertion loss.

9. The signal conditioning apparatus of claim 7, wherein the alteration further comprises a flatter frequency response.

10. The signal conditioning apparatus of claim 9, wherein the flatter frequency response includes a range of frequencies from direct current (DC) to 300 Megahertz (MHz).

11. The signal conditioning apparatus of claim 10, wherein the shunting circuit further comprises a capacitor.

12. The signal conditioning apparatus of claim 11, wherein the resistor, the inductor, and the capacitor are connected in series between the positive and negative terminal.

13. The signal conditioning apparatus of claim 11, wherein the capacitor is selected to enable single ended signaling via the differential pair.

14. A method for equalizing a high speed serial bus, comprising:
determining a high speed serial bus configuration based on a physical parameter associated with a device attached to the high speed serial bus;
selecting one or more tuning considerations;
selecting a shunting impedance from one or more possible shunting impedances, the one or more possible shunting impedances comprising a first impedance associated with Universal Serial Bus (USB) enumeration and a second impedance associated with USB operations other than USB enumeration, the selecting of the shunting impedance being based on the selected one or more tuning considerations and the physical parameter associated with the device attached to the high speed serial bus; and
enabling the selected shunting impedance.

15. The method of claim 14, wherein the determining the high speed serial bus configuration comprises discovering the device attached to the high speed serial bus.

16. The method of claim 14, wherein the determining the high speed serial bus configuration comprises determining one or more operational modes.

17. The method of claim 16, wherein the selecting of the one or more tuning considerations comprises flattening a frequency response corresponding to at least one of the one or more operational modes.

18. The method of claim 16, wherein the selecting of the one or more tuning considerations comprises increasing an insertion loss corresponding to at least one of the one or more operational modes.

19. The method of claim 18, wherein the increasing of the insertion loss comprises enabling a higher transmit power setting.

* * * * *